United States Patent
Yamauchi et al.

(10) Patent No.: US 9,395,803 B2
(45) Date of Patent: Jul. 19, 2016

(54) MULTI-CORE PROCESSOR SYSTEM IMPLEMENTING MIGRATION OF A TASK FROM A GROUP OF CORES TO ANOTHER GROUP OF CORES

(71) Applicant: FUJITSU LIMITED, Kawasaki (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 13/707,920

(22) Filed: Dec. 7, 2012

(65) Prior Publication Data

US 2013/0097441 A1      Apr. 18, 2013

Related U.S. Application Data

(63) Continuation of application No. PCT/JP2010/059876, filed on Jun. 10, 2010.

(51) Int. Cl.
*G06F 1/32* (2006.01)
*G06F 17/30* (2006.01)
*G06F 9/50* (2006.01)
*G06F 9/455* (2006.01)

(52) U.S. Cl.
CPC ............ *G06F 1/3287* (2013.01); *G06F 1/3228* (2013.01); *G06F 9/5088* (2013.01); *G06F 17/303* (2013.01); *G06F 9/45533* (2013.01); *Y02B 60/146* (2013.01); *Y02B 60/148* (2013.01); *Y02B 60/162* (2013.01)

(58) Field of Classification Search
CPC ....... G06F 9/50; G06F 1/3203; G06F 1/3293; G06F 1/3287; G06F 1/3234; G06F 1/3237
USPC ......................................................... 713/300
See application file for complete search history.

(56) References Cited

U.S. PATENT DOCUMENTS

| 5,418,969 A |  | 5/1995 | Matsuzaki et al. |
| 5,506,987 A | * | 4/1996 | Abramson ............ G06F 9/5033 718/103 |

(Continued)

FOREIGN PATENT DOCUMENTS

| JP | 3-286213 | 12/1991 |
| JP | 4-215168 | 8/1992 |

(Continued)

OTHER PUBLICATIONS

Japanese Office Action mailed Jul. 16, 2013 in corresponding Japanese Application No. 2012-519178.

(Continued)

*Primary Examiner* — Thomas Lee
*Assistant Examiner* — Santosh R Poudel
(74) *Attorney, Agent, or Firm* — Staas & Halsey LLP

(57) ABSTRACT

A multi-core processor system includes a core configured to detect among multiple cores, a state of migration of first software from a first core to the core whose specific processing capacity value is lower than that of the first core; and set the processing capacity value of the first core at a time of the detection to be a processing capacity value that is lower than that before the migration when detecting the state of migration.

12 Claims, 14 Drawing Sheets

(56) References Cited

U.S. PATENT DOCUMENTS

| | | | |
|---|---|---|---|
| 5,692,192 A | 11/1997 | Sudo | |
| 5,913,068 A | 6/1999 | Matoba | |
| 7,093,147 B2* | 8/2006 | Farkas et al. | 713/320 |
| 7,996,839 B2* | 8/2011 | Farkas et al. | 718/102 |
| 9,032,101 B1* | 5/2015 | Cox | G06F 12/1081 710/3 |
| 2005/0013705 A1* | 1/2005 | Farkas et al. | 417/393 |
| 2005/0289365 A1* | 12/2005 | Bhandarkar | 713/300 |
| 2006/0095807 A1* | 5/2006 | Grochowski et al. | 713/324 |
| 2006/0184809 A1 | 8/2006 | Kojou et al. | |
| 2006/0274368 A1 | 12/2006 | Imine | |
| 2007/0136617 A1 | 6/2007 | Kanno et al. | |
| 2007/0283349 A1* | 12/2007 | Creamer | G06F 9/5027 718/100 |
| 2008/0163255 A1* | 7/2008 | Munoz | G06F 11/2051 719/318 |
| 2008/0270767 A1 | 10/2008 | Sonobe et al. | |
| 2008/0288748 A1* | 11/2008 | Sutardja et al. | 712/20 |
| 2009/0064164 A1* | 3/2009 | Bose | G06F 1/206 718/105 |
| 2009/0106409 A1 | 4/2009 | Murata | |
| 2009/0150896 A1 | 6/2009 | Tsushima et al. | |
| 2010/0005474 A1* | 1/2010 | Sprangle et al. | 718/104 |
| 2010/0023940 A1 | 1/2010 | Iwamatsu et al. | |
| 2010/0037034 A1* | 2/2010 | Balakrishnan et al. | 711/221 |
| 2010/0058086 A1* | 3/2010 | Lee | 713/322 |
| 2010/0100886 A1* | 4/2010 | Takagi et al. | 718/104 |
| 2010/0299472 A1* | 11/2010 | Tanaka et al. | 710/269 |
| 2011/0271126 A1* | 11/2011 | Hill | G06F 1/3203 713/320 |

FOREIGN PATENT DOCUMENTS

| | | |
|---|---|---|
| JP | 8-30472 | 2/1996 |
| JP | 9-114540 | 5/1997 |
| JP | 9-138716 | 5/1997 |
| JP | 9-185589 | 7/1997 |
| JP | 10-78828 | 3/1998 |
| JP | 10-187636 | 7/1998 |
| JP | 11-65721 | 3/1999 |
| JP | 2004-249687 | 9/2004 |
| JP | 2006-99489 | 4/2006 |
| JP | 2006-221453 | 8/2006 |
| JP | 2006-345102 | 12/2006 |
| JP | 2007-148952 | 6/2007 |
| JP | 2008-513912 | 5/2008 |
| JP | 2008-146514 | 6/2008 |
| JP | 2008-276395 | 11/2008 |
| JP | 2009-116852 | 5/2009 |
| JP | 2009-140157 | 6/2009 |
| JP | 2009-193385 | 8/2009 |
| JP | 2010-33207 | 2/2010 |

OTHER PUBLICATIONS

Keiji Kimura et al., "OSCAR API for Real-time Low-Power Multicores and Its Performance on Multicores and SMP Servers", 2009, pp. 1-15.

International Search Report of PCT/JP2010/059876 mailed Jul. 6, 2010.

International Preliminary Report on Patentability mailed Jan. 24, 2013, issued in corresponding PCT Patent Application No. PCT/JP2010/059876.

Japanese Office Action mailed Dec. 24, 2013 in corresponding Japanese Application No. 2012-519178.

Japanese Office Action issued Apr. 28, 2015 in corresponding Japanese Patent Application No. 2014-165036.

Chinese Office Action issued Jan. 12, 2015 in corresponding Chinese Patent Application No. 201080067340.6.

Office Action issued by the State Intellectual Property Office of P.R. of China on Oct. 29, 2015 in corresponding Chinese patent application No. 201080067340.6.

Chinese Office Action dated May 11, 2016 in corresponding Chinese Patent Application No. 201080067340.6.

* cited by examiner

| | MUSIC REPRODUCTION SOFTWARE 207+OS | OS | PARALLEL SOFTWARE |
|---|---|---|---|
| HIGH CPU GROUP MAXIMUM: 600 [MHz] — CLOCK FREQUENCY [MHz] | 200 | 100 | 20 |
| HIGH CPU GROUP MAXIMUM: 600 [MHz] — POWER CONSUMPTION [mW] | 240 | 120 | 24 |
| LOW CPU GROUP MAXIMUM: 200 [MHz] — CLOCK FREQUENCY [MHz] | 200 | 100 | 20 |
| LOW CPU GROUP MAXIMUM: 200 [MHz] — POWER CONSUMPTION [mW] | 200 | 100 | 20 |

1102

| POWER CONSUMPTION IN NORMAL MODE [mW] | 240+20=260 |
|---|---|
| POWER CONSUMPTION IN LOW POWER MODE [mW] | 24+200=224 |

FIG.12

| EVENT TYPE | CONTENT OF EVENT |
|---|---|
| TRANSITION TO LOW POWER MODE | INSTRUCTION BY USER TO TRANSITION TO LOW POWER MODE |
| TRANSITION TO LOW POWER MODE | HIGH-LOAD SOFTWARE NOT EXECUTED FOR SPECIFIC TIME PERIOD |
| TRANSITION TO LOW POWER MODE | REMAINING POWER OF BATTERY IS LESS THAN OR EQUAL TO GIVEN VALUE |
| ⋮ | ⋮ |
| TRANSITION TO NORMAL MODE | REQUEST FOR STARTING-UP OF GUI SOFTWARE 208 |
| TRANSITION TO NORMAL MODE | REQUEST FOR STARTING-UP OF VIDEO IMAGE REPRODUCTION SOFTWARE 206 |
| TRANSITION TO NORMAL MODE | REQUEST FOR STARTING-UP OF GAME SOFTWARE |
| TRANSITION TO NORMAL MODE | PREPARATION FOR STARTING UP HIGH-LOAD SOFTWARE |
| ⋮ | ⋮ |

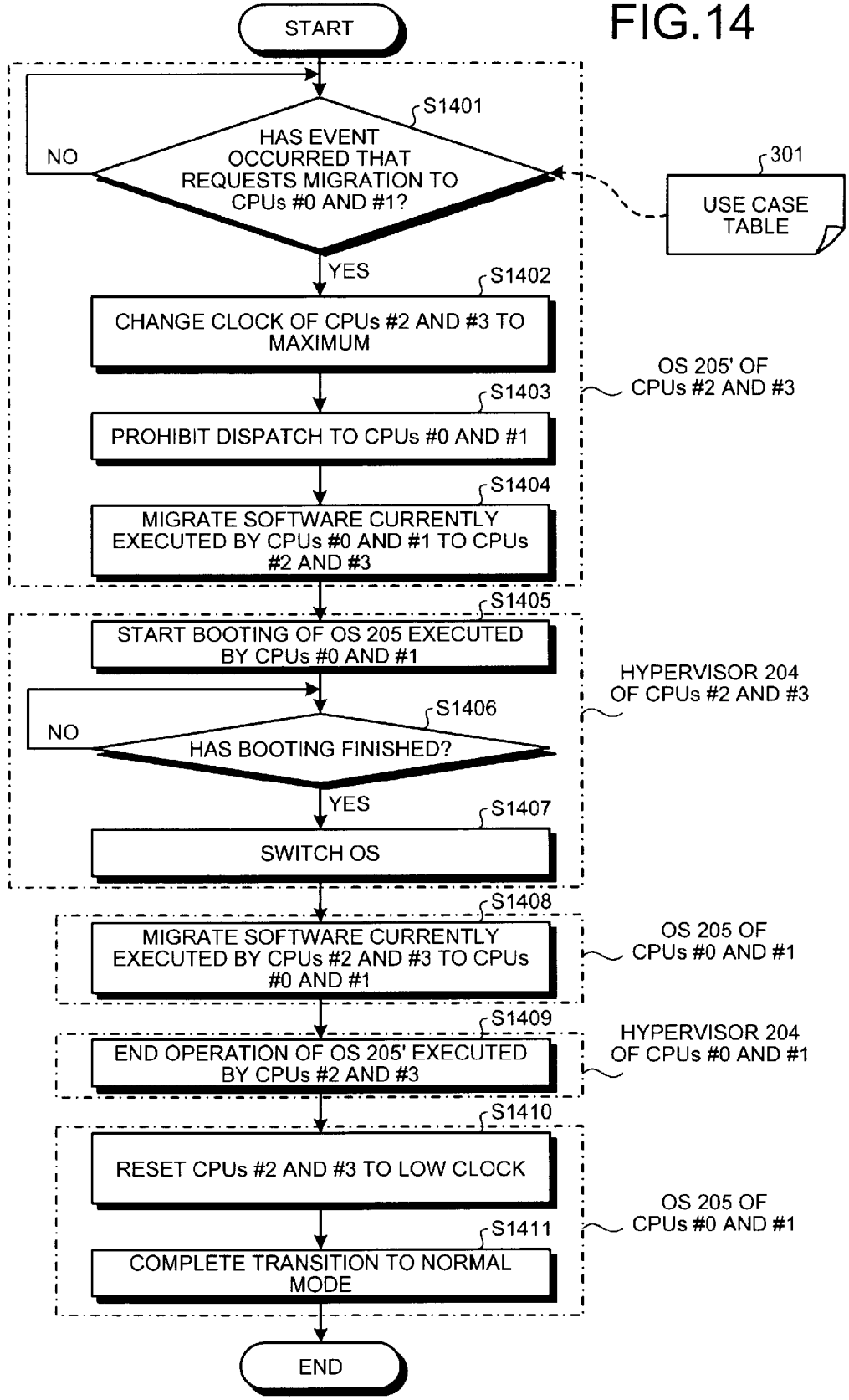

MULTI-CORE PROCESSOR SYSTEM IMPLEMENTING MIGRATION OF A TASK FROM A GROUP OF CORES TO ANOTHER GROUP OF CORES

CROSS REFERENCE TO RELATED APPLICATIONS

This application is a continuation application of International Application PCT/JP2010/059876, filed on Jun. 10, 2010 and designating the U.S., the entire contents of which are incorporated herein by reference.

FIELD

The embodiments discussed herein are related to a multi-core processor system, a power control method, and a power control program that control power.

BACKGROUND

A conventional multi-core processor system includes a symmetric multiple processor (SMP) that has plural cores of the same type and an asymmetric multiple processor (AMP) that has plural cores of different types. Thereby, the development cost may increase and the reliability may be degraded associated with the change of the program code.

In contrast, when a software asset is handed down to the AMP, high-load software are distributed to and executed by cores and consequently, no change occurs to the program code and the performance is improved. The AMP to which the high-load software is distributed includes a low-clock frequency processor core that controls the entire AMP and a high-clock frequency processor core that executes high-load processing within short period. A multi-core processor system having plural processor cores of differing performance is referred to as "heterogeneous multi-core processor system".

Various power saving techniques are applied to an embedded apparatus such as a mobile telephone to increase the battery life time by reducing the power consumption. Even for the same battery life time, by reducing the power consumption, the battery can be downsized, and the weight and the volume of the entire embedded apparatus can be reduced.

A power saving technique of a heterogeneous multi-core processor system has been disclosed where power saving is facilitated by switching a central processing unit (CPU) to cause a program to operate, corresponding to the load of the CPU (see, e.g., Japanese Laid-Open Patent Publication No. H04-215168).

Another power saving technique of a heterogeneous multi-core processor system has been disclosed where power saving is facilitated by selecting a CPU to which a program is to be assigned, from among a dedicated CPU and a general-purpose CPU according to whether the system is driven by an external power source or a battery (see, e.g., Japanese Laid-Open Patent Publication No. 2008-276395).

A technique is disclosed of facilitating power saving by executing dynamic voltage and frequency scaling (DVFS) control (see, e.g., Kimura, Keiji, et al, "OSCAR API for Real-time Low-Power Multicores and Its Performance on Multicores and SMP Servers", Department of Computer Science and Engineering, Vol. 2, No. 3, September 2009, pp. 96-106). The "DVFS control" is a technique of reducing the power consumption by reducing as much as possible the voltage and the frequency within the range of the longest allowed program execution restriction time period because the power consumption is proportional to the voltage or the frequency.

However, with the technique according to Japanese Laid-Open Patent Publication No. H04-215168, a leak current is generated from a CPU to which no process is assigned and particularly, when the frequency of the processor is high, the power consumption is increased by the leak current.

With the technique according to Japanese Laid-Open Patent Publication No. 2008-276395, the CPU to which a program is to be assigned is selected according to whether the power source used is an external power source or a battery. When the system is driven by a battery, a CPU is selected whose performance is low and establishes a power saving state. Therefore, a problem arises in that the execution time of the program is always long even when the battery has sufficient power.

With the technique according to Kimura, Keiji, et al, multiple power source voltages are required and dedicated circuits have to be implemented for the voltages. Therefore, a problem arises in that the production cost and the area for implementing the system increase. The technique according to Kimura, Keiji, et al is directed to the state of multiple cores and a single thread. Therefore, when a multi-thread operation is executed, the threads mutually affect one other. Therefore, another problem arises in that estimation of the thread execution ending time is difficult.

SUMMARY

According to an aspect of an embodiment, a multi-core processor system detects among multiple cores, a state of migration of first software from a first core to the core whose specific processing capacity value is lower than that of the first core; and sets the processing capacity value of the first core at a time of the detection to be a processing capacity value that is lower than that before the migration when detecting the state of migration.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram for explaining an example of the power consumption of the multi-core processor system 100 in the normal mode and the low power mode, respectively;

FIG. 12 is a diagram for explaining an example of the contents of a use case table 301;

FIG. 14 is a flowchart of the transition process from the low power mode to the normal mode.

DESCRIPTION OF EMBODIMENTS

Preferred embodiments of a multi-core processor system, power control method, and power control program according to the present invention will be described in detail with reference to the accompanying drawings.

Figure 1:
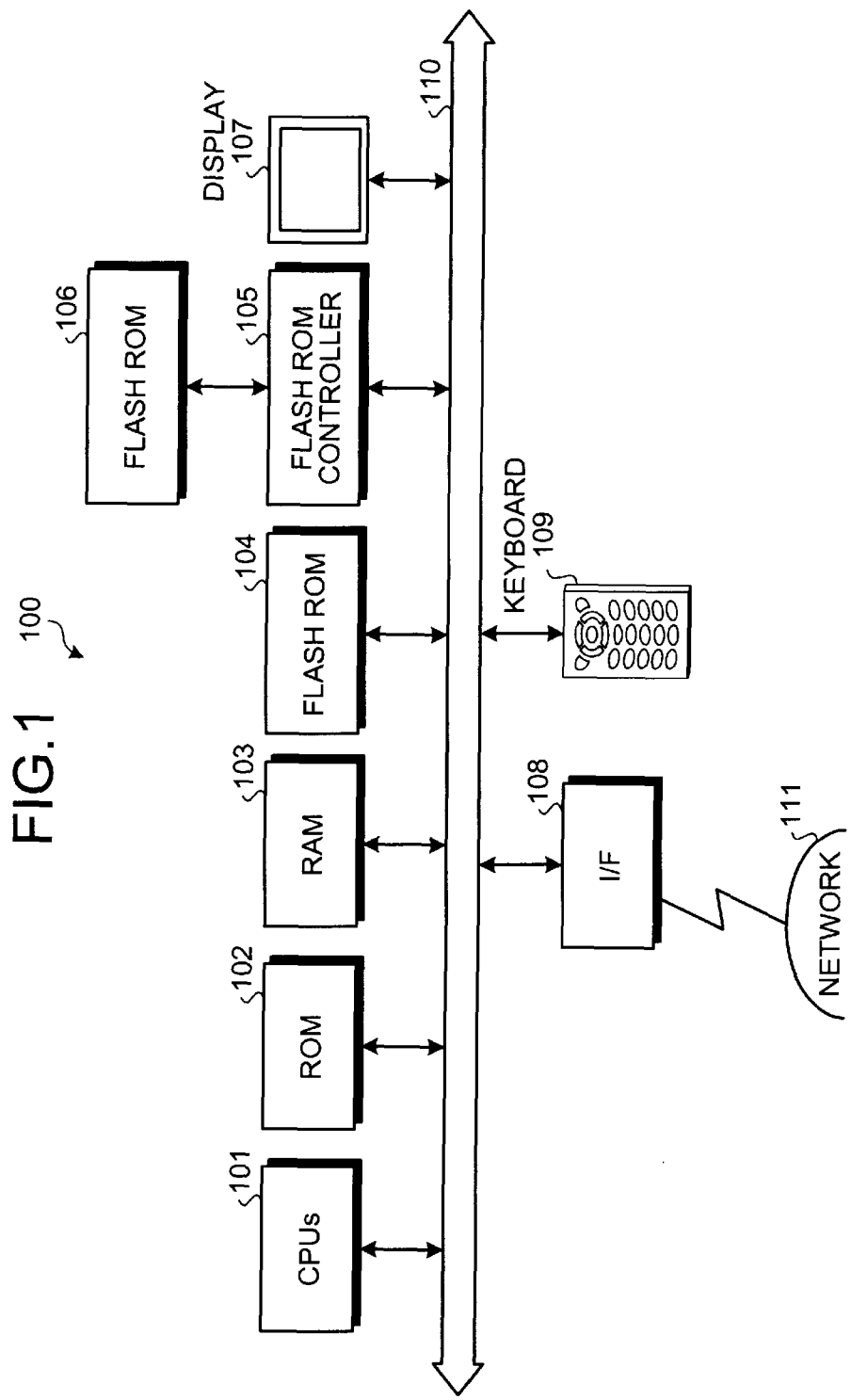
FIG. 1 is a block diagram of a hardware configuration of a multi-core processor system according to an embodiment.

FIG. 1 is a block diagram of a hardware configuration of a multi-core processor system according to an embodiment. As depicted in FIG. 1, a multi-core processor system 100 includes multiple central processing units (CPUs) 101, read-only memory (ROM) 102, random access memory (RAM) 103, flash ROM 104, a flash ROM controller 105, and flash ROM 106. The multi-core process system includes a display 107, an interface (I/F) 108, and a keyboard 109, as input/output devices for the user and other devices. The components of the multi-core system 100 are respectively connected by a bus 110.

The CPUs 101 govern overall control of the multi-core processor system 100. The CPUs 101 refer to CPUs that are single core processors connected in parallel. Details of the CPUs 101 will be described hereinafter with reference to FIG. 2. Further, the multi-core processor system 100 is a system of computers that include processors equipped with multiple cores. Provided that multiple cores are provided, implementation may be by a single processor equipped with multiple cores or a group of single-core processors in parallel. In the present embodiments, description will be given taking heterogeneous multi-cores as an example where single-core processor CPUs are connected in parallel and have differing performance.

The ROM 102 stores therein programs such as a boot program. The RAM 103 is used as a work area of the CPUs 101. The flash ROM 104 stores system software such as an operating system (OS), and application software. For example, when the OS is updated, the multi-core processor system 100 receives a new OS via the I/F 108 and updates the old OS that is stored in the flash ROM 104 with the received new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data received by the user of the multi-core processor system through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input and output of data with respect to external apparatuses. For example, a modem or a LAN adaptor may be employed as the I/F 108.

The keyboard 109 includes, for example, keys for inputting letters, numerals, and various instructions and performs the input of data. Alternatively, a touch-panel-type input pad or numeric keypad, etc. may be adopted.

Figure 2:
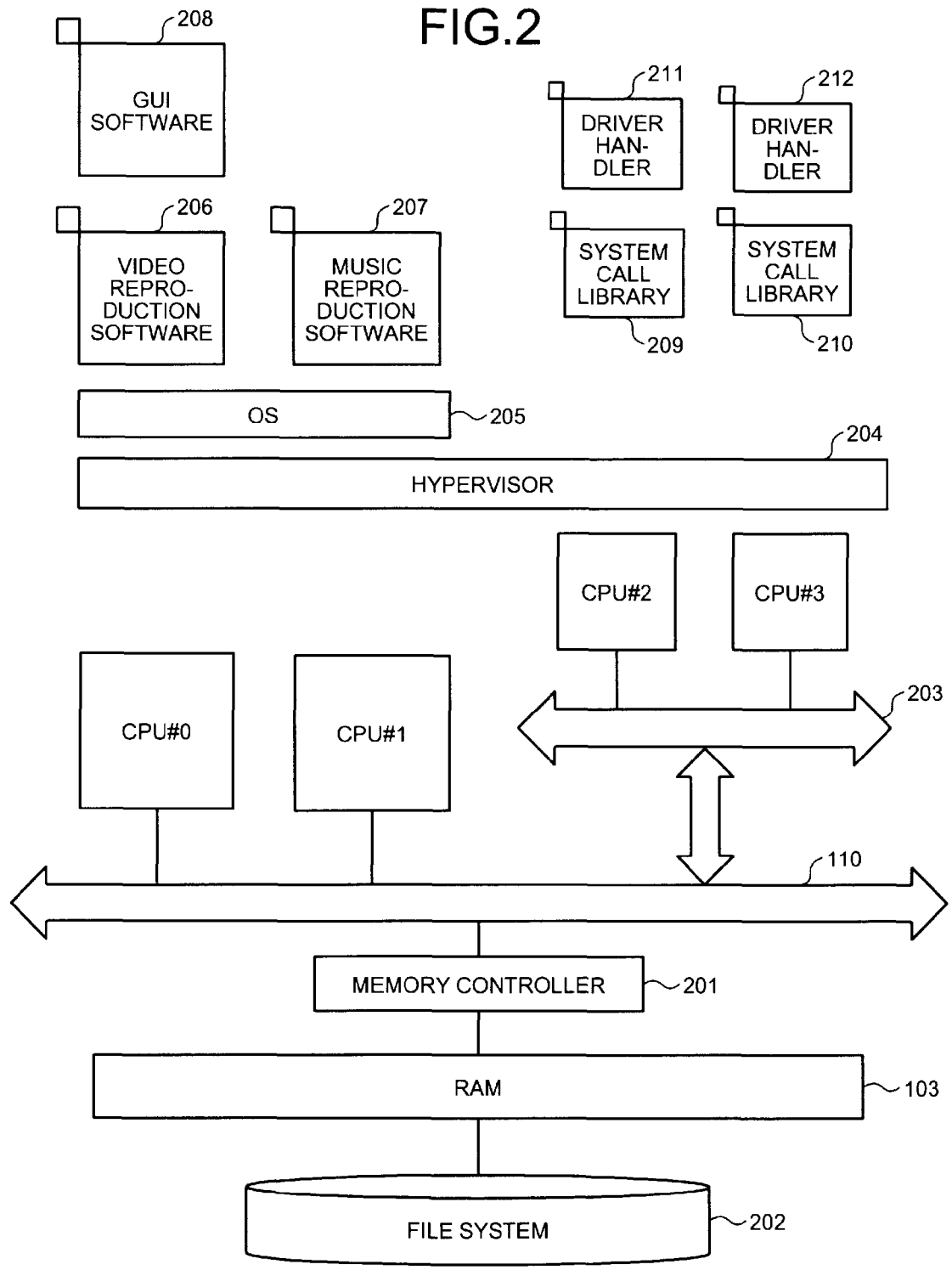
FIG. 2 is a block diagram of a portion of the hardware, and software of a multi-core processor system 100.

FIG. 2 is a block diagram of a portion of the hardware, and software of the multi-core processor system 100. The hardware depicted in FIG. 2 includes a memory controller 201, the RAM 103, and CPUs #0 to #3 that are included among the CPUs 101. The memory controller 201 and the CPUs #0 to #3 are connected via the bus 110. The CPUs #2 and #3 are connected via a bus 203.

The memory controller 201 controls access of the RAM 103 by the CPUs #0 to #3. The memory controller 201 may control access of the ROM 102, the flash ROM 104, etc., in addition to the RAM 103. The memory controller 201 has a function of coordinating access when the CPUs simultaneously access the RAM 103.

The CPUs #0 and #1 are a group of CPUs whose maximal processing capacity values are high. The CPUs #2 and #3 are a group of CPUs whose maximal processing capacity values are low. The CPUs #0 and #1 are high clock frequency CPUs and have large capacity local cache memories. Therefore, the computing capacities and the power consumption of the CPUs #0 and #1 are high. The CPUs #2 and #3 are low-clock frequency CPUs and have low capacity local cache memories. Therefore, the computing capacities and the power consumption of the CPUs #2 and #3 are low.

When a CPU whose maximal processing capacity value is high and a CPU whose maximal processing capacity value is low are set to be at the same clock, a CPU whose maximal processing capacity value is high, has more elements such as a local cache memory and therefore, has a higher power consumption the than other CPU. The maximal processing capacity values of the CPUs #0 and #1 of the group of CPUs whose maximal processing capacity values are high may be equal to or may be different from each other. The same holds for the CPU #2 and the CPU #3.

Each of the CPUs has a local cache memory and executes a computing process by accessing the local cache memory. When each of the CPUs accesses data that is not stored in the local cache memory, the CPU accesses the ROM 102, the RAM 103, the flash ROM 104, etc., from the memory controller 201.

The software depicted in FIG. 2 includes a file system 202, a hypervisor 204, an OS 205, video reproduction software 206, music reproduction software 207, and GUI software 208. FIG. 2 depicts system call libraries 209 and 210, and driver handlers 211 and 212 as software provided by a portion of the OS.

The file system 202 has a function of accessing files using the function of the OS 205, that are data stored in the flash ROMs 104 and 106 that are auxiliary storage apparatuses. For example, the file stored in the flash ROM 106 is read by the CPU #0 into the RAM 103. The data updated by the CPU #0 is written into the flash ROM 106 as a file.

The hypervisor 204 is a program that operates directly on the hardware. The hypervisor 204 can execute privileged instructions such as those to directly refer to a register in a CPU, to read information in the register in the CPU, and to rewrite information in a special register that executes an I/O operation in the CPU. The hypervisor 204 executes cache control of a CPU that can not be operated using an ordinary program, and operates using a space on a memory that can not be read from and written into using an ordinary program. The hypervisor 204: is positioned between the OS and the CPUs; and based on the above characteristics, monitors the OS, resets the OS when the OS hangs up, and sets the OS to be in a power saving mode when the OS executes no thread.

The OS 205 is a program that controls the multi-core processor system 100. For example, the OS 205 provides a library used by the video reproduction software 206 to the GUI software 208. The OS 205 manages the memories such as the ROM 102 and the RAM 103. The OS 205 executes a scheduling process for the software that are executed by the CPUs #0 to #3.

The video reproduction software 206 is software to reproduce a video image file on the display 107. For the video reproduction software 206 to operate normally, high processing capacity is required of the CPU that executes the software 206. The music reproduction software 207 is software to reproduce a sound file. The GUI software 208 is software that administers an interface between the multi-core processor system 100 and a user. For example, the GUI software 208 detects an external event from the keyboard 109 and executes a start-up request of the video reproduction software 206 or the music reproduction software 207 for the OS 205.

The system call libraries 209 and 210 are software for the OS 205 to provide a general-purpose function for each application software, etc. For example, when the video reproduction software 206 reproduces a video image file, the video reproduction software 206 executes a decoding process according to the encoding of the video image file. For example, when the video image file is based on a moving picture experts group (MPEG), the video reproduction software 206 executes an MPEG decoding process. The MPEG decoding process is executed for software and therefore, the OS 205 may provide such a process as a system call library. The software can execute respective general-purpose functions by accessing the system call library.

The driver handlers 211 and 212 are each software to provide hardware access to the OS 205, the application software, etc. Hardware properties differ according to hardware and therefore, the driver handlers each execute a process unique to the hardware and each provide an input and output method defined in the specification for the OS 205. For example, the CPU #0 receives an interrupt signal indicating that a button has been pressed down on the keyboard 109, and the driver handler 212 executes a process corresponding to the interrupt signal through the OS 205. After the process, the driver handler 212 notifies the OS 205 of the process as a key-down event defined by the OS 205.

In FIG. 2, the OS 205 is executed on the CPUs #0 and #1. The video reproduction software 206 and the GUI software 208 are executed by the CPU #0. The music reproduction software 207 is executed by the CPU #1. The system call library 209 and the driver handler 211 are executed by the CPU #2. The system call library 210 and the driver handler 212 are executed by the CPU #3.

As described, the video reproduction software 206, the music reproduction software 207, and the GUI software 208 are application software distributed to and executed at one CPU, respectively. The video reproduction software 206, the music reproduction software 207, and the GUI software 208 are not executed in parallel by plural CPUs because, for example, the programs of the conventional software are not described taking into consideration any parallelism. Extraction of the parallelism is difficult from the program not written taking into consideration any parallel processing and when the program is rewritten into a program for parallel processing, the risks of increased development cost and questionable reliability are high. Therefore, software to which the parallel processing is applicable are the driver handler, the system call library, etc., and other kinds of software are consequently distributed to each CPU and executed.

In the multi-core processor system 100 according to the embodiment, the group of CPUs are divided into the two CPU groups, including the group of CPUs whose maximal processing capacity values are high; and the group of CPUs whose maximal processing capacity values are low. However, the CPUs may be divided into three or more groups, e.g., a group of CPUs whose maximal processing capacity values are highest, distribute and execute high-load software such as the video reproduction software 206; a group of CPUs whose maximal processing capacity values are intermediate, distribute and execute intermediate-load software such as business software; and a group of CPUs whose maximal processing capacity values are lowest, distribute and execute parallel processing for low-load software to which parallel processing is applicable. As described, the group of CPUs may be divided into three or more groups according to the processing capacity value required by the software to be executed.

Figure 3:
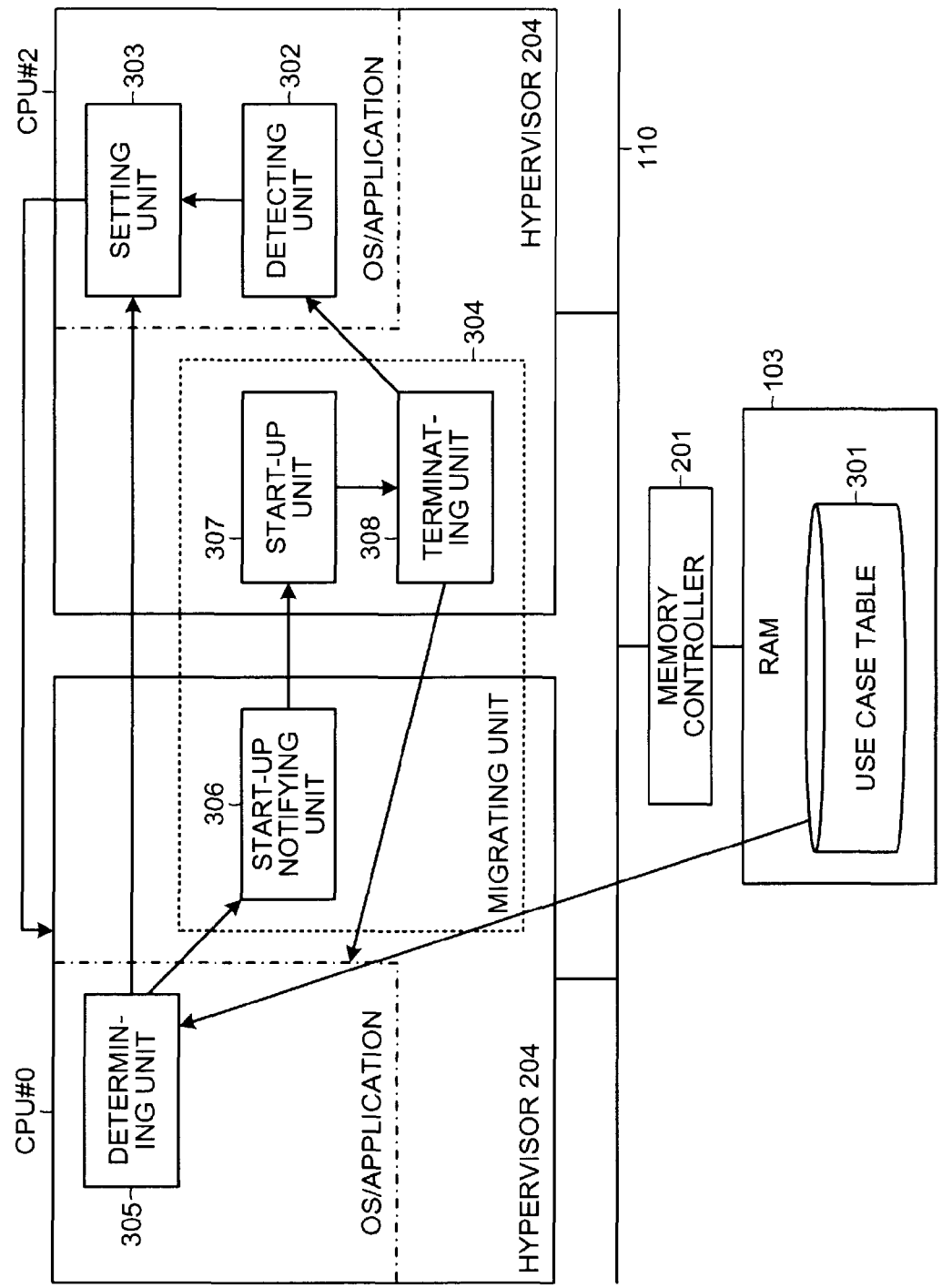
FIG. 3 is a block diagram of functions of the multi-core processor system 100.

Functions of the multi-core processor system 100 will be described. FIG. 3 is a block diagram of the functions of the multi-core processor system 100. The multi-core processor system 100 includes a detecting unit 302, a setting unit 303, a migrating unit 304, and a determining unit 305. These functions (the detecting unit 302 to the determining unit 305) forming a control unit are implemented by executing on the CPUs #0 to #3, programs stored in a storage apparatus. A "storage apparatus" is, for example, the ROM 102, the RAM 103, the flash ROM 104 or 106, etc.

The multi-core processor system 100 can access a use case table 301 stored in the RAM 103 as a database having an event stored therein that enables specific software to migrate to a core whose maximal processing capacity value is lower than that of the migration origin core. The details of the use case table 301 will be described later with reference to FIG. 12. The use case table 301 may further indicate an event that requests migration to a core whose maximal processing capacity value is high. The specific software is, for example, the OS. The specific software may be software that is executable by either the group of CPUs whose maximal processing capacity values are high or the group of CPUs whose maximal processing capacity values are low. The "maximal processing capacity value" is the highest clock frequency that can be set in the corresponding CPU.

For the units from the detecting unit 302 to the terminating unit 308 described later, the group of functions will be described for a case where the specific software currently executed by the CPUs #0 and #1 whose maximal processing capacity values are high is caused to migrate to the CPUs #2 and #3 whose maximal processing capacity values are low.

The migrating unit 304 includes a start-up notifying unit 306, a start-up unit 307, and the terminating unit 308. The CPU #0 includes the determining unit 305 and the start-up notifying unit 306. The CPU #2 includes the detecting unit 302, the setting unit 303, the start-up unit 307, and the terminating unit 308. FIG. 3 depicts the CPU #0 as one CPU in the group of CPUs whose maximal processing capacity values are high and the CPU #2 as one CPU in the group of CPUs whose maximal processing capacity values are low. However, each of the other CPUs may include the above functions. For example, the CPU #1 may also include the migrating unit 304 and the start-up notifying unit 306. The detecting unit 302, the setting unit 303, and the determining unit 305 are executed by the function of the OS and the migrating unit 304 is executed by the function of the hypervisor 204.

The detecting unit 302 has a function of detecting among the multiple cores, a state of migration of the specific software from a migration origin core to a migration destination core whose specific processing capacity value is lower than that of the migration origin core. The "specific processing capacity value" is the maximal processing capacity value that can be assumed by the core. The "specific processing capacity value" may be the maximal value of the processing capacity values that can guarantee the normal operation of the core. For example, the specific processing capacity value may be the maximal value of the processing capacity values with which the amount of heat generated by the core can remain within a permissible range. The detecting unit 302 may detect a state of migration of the specific software from the migration origin core to the migration destination core by the migrating unit 304.

For example, the detecting unit 302 detects a state of migration where, the OS executed by the CPUs #0 and #1 is migrated to the CPUs #2 and #3 for execution. The result of the detection is stored to a storage area such as a register of the CPU #2 or the RAM 103.

In FIG. 3, the detecting unit 302 detecting a state of migration is depicted as a function of the CPU #2 that is the migration destination core. However, the CPU #0 to be the migration origin core may execute the detecting unit 302. When a core instructing the migration of the specific software is present as a core other than the migration origin core and the migration destination core, the core instructing the migration may execute the detecting unit 302.

The setting unit 303 has a function of setting, when the detecting unit 302 detects a state of migration, the processing capacity value of the migration origin core at the time of the detection, to be a processing capacity value that is lower than that before the migration. When the determining unit 305 determines that an event enabling the migration occurs and the detecting unit 302 detects a state of migration, the setting unit 303 may set the processing capacity value of the migration origin core at the time of the detection to be a processing capacity value that is lower than that before the migration.

For example, when the detecting unit 302 detects a state of migration of the OS from the CPUs #0 and #1 to the CPUs #2 and #3, the setting unit 303 sets the clock frequency of the CPUs #0 and #1 to be a processing capacity value that is lower than that before the migration. For example, the setting unit 303 may set the clock frequencies of the CPUs #0 and #1 to be in an ultra-low clock state with which the system call library 209 to the driver handler 212 executed in parallel can be executed. The value of the clock frequency set may be stored to a storage area such as the RAM 103.

The migrating unit 304 has a function of migrating the specific software from the migration origin core currently executing the specific software to the migration destination core when the specific software includes software that migrates another software from the migration origin core to the migration destination core. When the determining unit 305 determines that an event that requests migration occurs, the migrating unit 304 may cancel the migration of the specific software and does not consequently have to migrate the specific software. The "software that migrates other software from the migration origin core to the migration destination core" is a migration process and an example of the specific software including this software is an OS.

For example, the migrating unit 304 starts up the OS using the CPUs #2 and #3; switches the OS managing the multi-core processor system 100 from the OS 205 to an OS newly started up; causes the operation of the OS 205 to come to an end; and thereby, causes the OS to be migrated. Information concerning the completion of the migration is stored to a storage area such as the register of the CPU #2.

The determining unit 305 has a function of determining whether an occurring event is an event enabling migration, based on the use case table 301 indicating events that enable the specific software to migrate to a core whose specific processing capacity value is lower than that of the migration origin core. The determining unit 305 may determine whether an occurring event is an event that requests migration, based on the use case table 301 indicating events that request the migration of the specific software to a core whose specific processing capacity value is higher than that of the migration origin core.

For example, when an event occurs that high-load software is not executed for a specific time period in the multi-core processor system 100, the determining unit 305 determines whether this event is registered in the use case table 301. The result of this determination is stored to a storage area such as the register of the CPU #0 or the RAM 103.

The start-up notifying unit 306 has a function of notifying the migration destination core of an instruction to start up the specific software when the determining unit 305 determines that an event enabling the migration occurs. For example, the start-up notifying unit 306 notifies the hypervisor 204 of an instruction to start up the OS using the CPUs #2 and #3. The content of the instruction is stored to a storage area such as a register of the CPU #0.

The start-up unit 307 has a function of starting up the specific software when the start-up unit 307 receives notification to start up the specific software from the start-up notifying unit 306. For example, when the start-up unit 307 receives notification to start up the OS using the hypervisor 204, the start-up unit 307 boots the OS using the CPUs #2 and #3. The information on the completion of the starting up of the OS is stored to a storage area such as the register of the CPU #2.

The terminating unit 308 has a function of causing the operation of the specific software that is currently executed by the migration origin core to come to an end when the start-up unit 307 completes the starting up of the specific software using the migration destination core. For example, when the start-up unit 307 completes the starting up of the OS to be executed by the CPUs #2 and #3, the terminating unit 308 causes the operation of the OS 205 executed by the CPUs #0 and #1 to come to an end. The information concerning the completion of ending the operation of the OS 205 is stored to a storage area such as the register of the CPU #2.

In the description above, the group of functions have been described for the case where the specific software currently executed by the CPUs #0 and #1 that are the migration origin cores and have high specific processing capacity values is migrated to the CPUs #2 and #3 that are the migration destination cores and have low specific processing capacity values. A group of functions will be described for the case where the specific software currently executed by the CPUs #2 and #3 that are the migration origin cores and have low specific processing capacity values is migrated to the CPUs #0 and #1 that are the migration destination cores and have high specific processing capacity values.

In this case, the functional units are exchanged between the CPUs whose specific processing capacity values are high and the CPUs whose specific processing capacity values are low.

For example, the CPU #2 includes the determining unit 305 and the start-up notifying unit 306 and the CPU #0 includes the detecting unit 302, the setting unit 303, the start-up unit 307, and the terminating unit 308. The migrating unit 304 and internal functions thereof, i.e., the start-up notifying unit 306, the start-up unit 307, and the terminating unit 308, after the exchange are same as the functions before the exchange and therefore, will not again be described.

The detecting unit 302 has a function of detecting a state of migration of the specific software to the migration destination cores whose specific processing capacity values are higher than those of the migration origin cores. For example, the detecting unit 302 detects a state of migration of the OS from a state where the OS is executed by the CPUs #2 and #3 to a state where the OS is executed by the CPUs #0 and #1. The result of the detection is stored to a storage area such as the register of the CPU #0 or the RAM 103.

The setting unit 303 has a function of setting the processing capacity values of the migration origin cores at the time of the detection to be processing capacity values that are lower than those before the migration when the detecting unit 302 detects the state of the migration. When the determining unit 305 further determines that an event occurs that requests the migration, the setting unit 303 may set the processing capacity values. For example, when the detecting unit 302 detects the state of the migration of the OS from the CPUs #2 and #3 to the CPUs #0 and #1, the setting unit 303 sets the clock frequencies of the CPUs #2 and #3 to be the processing capacity values that are lower than those before the migration. The numerical values of the clock frequencies set may be stored to a storage area such as the RAM 103.

The determining unit 305 has a function of determining whether an occurring event is an event that requests migration, based on the use case table 301 indicating events that request the migration of the specific software to cores whose specific processing capacity values are higher than those of the migration origin cores. For example, when an event occurs where starting up of high-load software is requested in the multi-core processor system 100, the determining unit 305 determines whether this event is registered in the use case table 301. The result of this determination is stored to a storage area such as the register of the CPU #2 or the RAM 103.

In the description that will be made with reference to FIGS. 4 to 14, for simplicity of the description, the description will be made assuming that the specific processing capacity value is the maximal processing capacity value.

Figure 4:
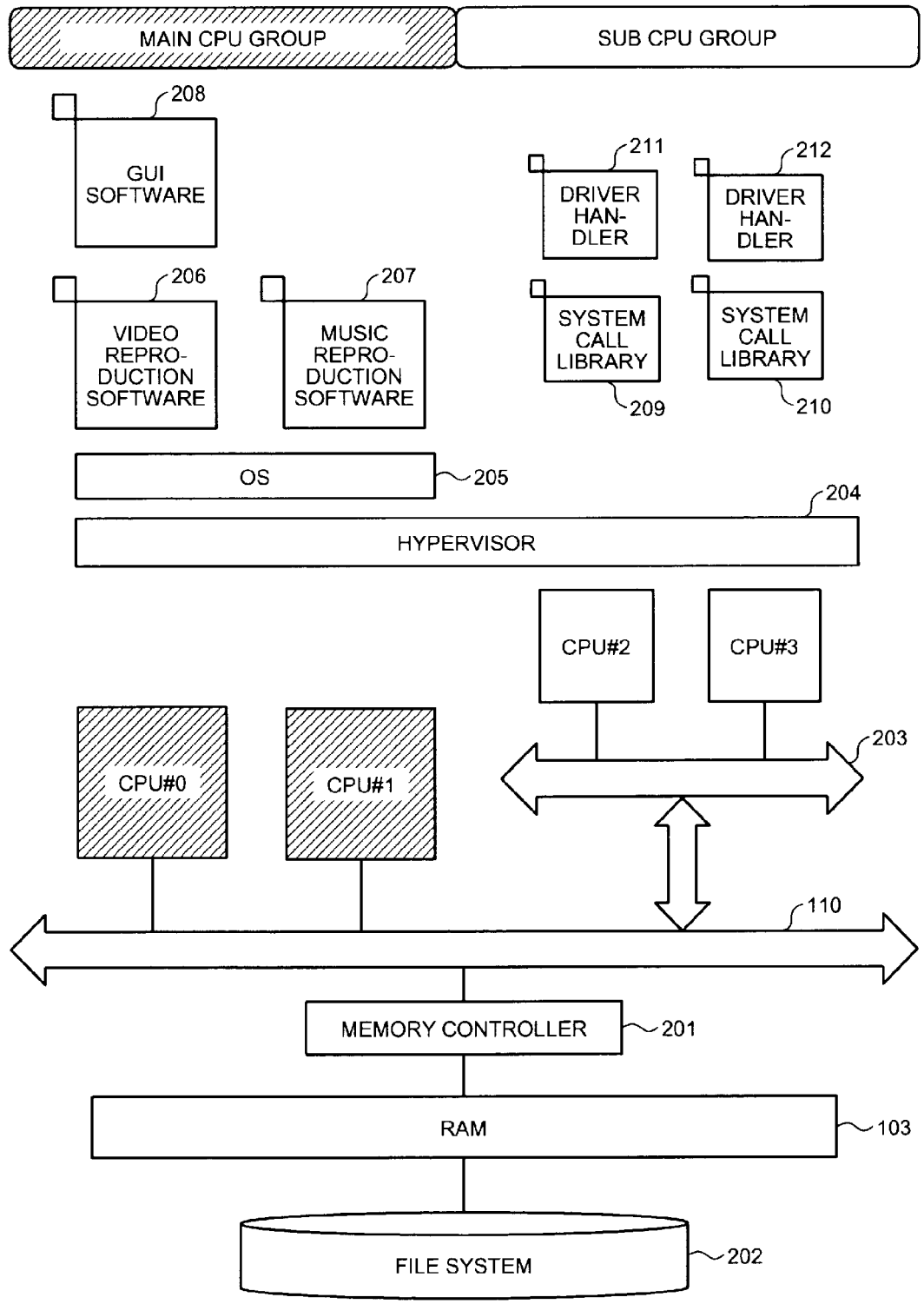
FIG. 4 is a diagram for explaining the state of the multi-core processor system 100 in a normal mode.

FIG. 4 is a diagram for explaining the state of the multi-core processor system 100 in a normal mode. In the multi-core processor system 100 in FIG. 4, the OS 205 is started up on the CPUs #0 and #1 whose maximal processing capacity values are high. The group of CPUs starting up the OS 205 is referred to as "main CPU group" and the group of CPUs not starting up the OS 205 is referred to as "sub CPU group". A state where the main CPU group includes the CPUs #0 and #1 whose maximal processing capacity values are high is referred to as "normal mode".

In the multi-core processor system 100 in the normal mode, the video reproduction software 206 to the GUI software 208 accounting for the majority of the entire processing are distributed to and executed by the CPUs #0 and #1. In the multi-core processor system 100, the software of the system call library 209 to the driver handler 212 capable of being executed in parallel are executed in parallel by the CPUs #2 and #3. The multi-core processor system 100 as a whole consumes power that is proportional to the high processing capacity values.

Figure 5:
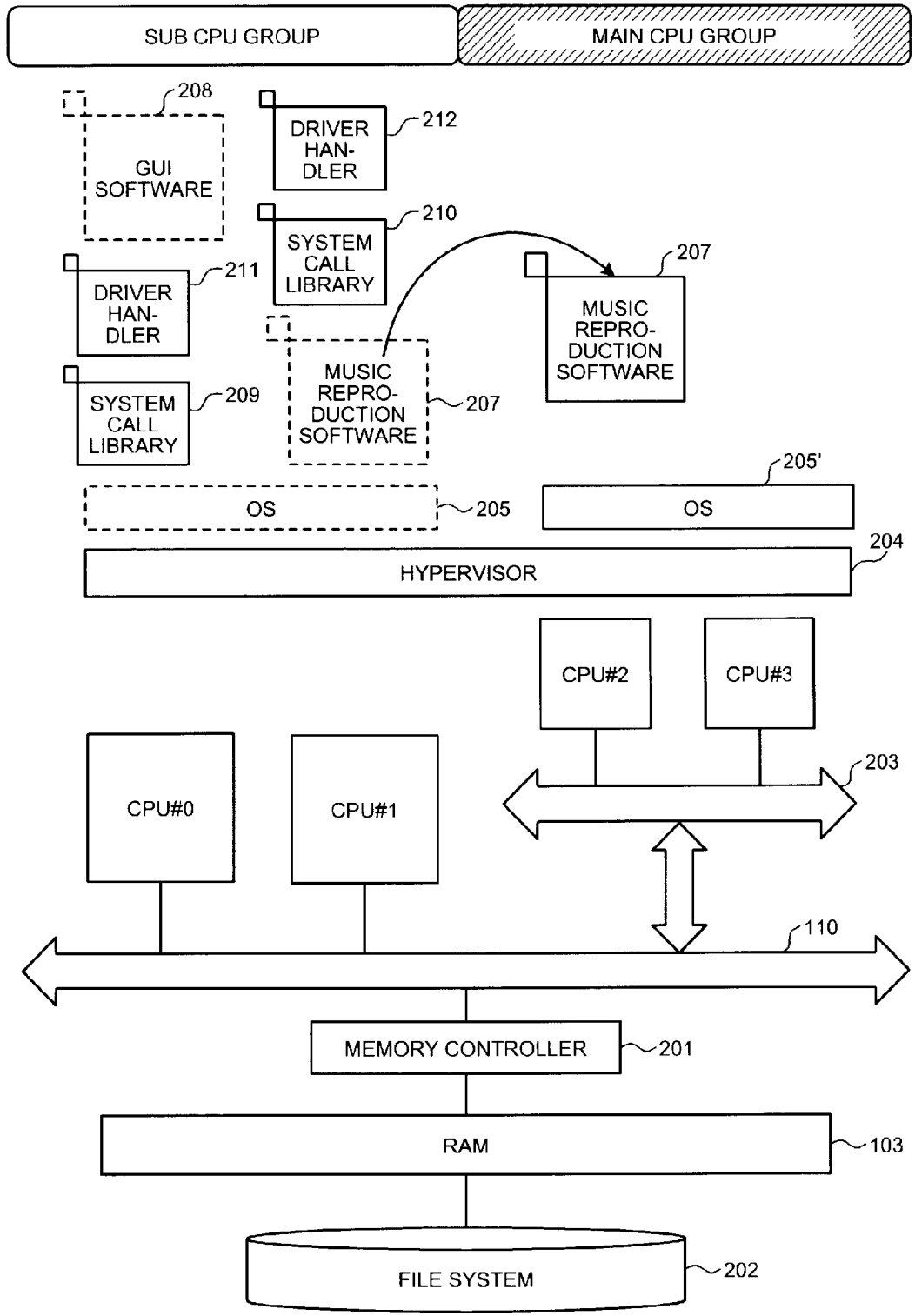
FIG. 5 is a diagram for explaining the state of the multi-core processor system 100 in a low power mode.

FIG. 5 is a diagram for explaining the state of the multi-core processor system 100 in a low power mode. In the multi-core processor system 100 in FIG. 5, the video reproduction software 206 is not yet started up and the GUI software 208 is standing by. When the multi-core processor system 100 detects this state, the multi-core processor system 100 migrates the software currently executed by the CPUs #2 and #3 to the CPUs #0 and #1 and, after the migration, starts up an OS 205' using the CPUs #2 and #3 whose maximal processing capacity values are low.

When the migration process is executed for software, the migration origin CPU saves to the RAM 103 or the file system 202, context information retained by each thread in the software to be migrated, for example, register information of the CPU including a program counter. When a stack area pointed by a stack pointer that is a portion of the register of the CPU present in an area that the migration destination CPU can not refer to such as, for example, the local memory of the migration origin CPU, the context information is saved thereto.

Subsequently, the migration origin CPU notifies the migration destination CPU of an address area for saving the context information. After the notification, the migration origin CPU deletes the thread of the software to be migrated, from a thread management table managed by the migration origin CPU. The migration destination CPU adds information concerning each thread of the software to a thread management table managed by the migration destination CPU; executes each thread of the software based on the context information retreated; and thereby, causes the migration process of the software to come to an end.

The OS 205' is an OS that executes the same processes as those of the OS 205. The OS 205' operates on the CPUs #2 and #3 whose maximal processing capacity values are low and therefore, may execute some of the processes executed by the OS 205. When the CPU #0 receives an interrupt signal, the process in response to the interrupt signal is executed by, for example, the driver handler 212 through the OS 205'.

After the OS 205' is started up, the multi-core processor system 100 migrates the music reproduction software 207 from the CPU #1 to the CPU #2. After the migration, the multi-core processor system 100 causes the operation of the OS 205 to come to an end and causes the CPUs #0 and #1 whose maximal processing capacity values are high to operate in the ultra-low clock state where the clock frequency supplied is decreased. The state is referred to as "low power mode" where the CPUs of the main CPU group are CPUs whose maximal processing capacity values are low as in FIG. 5.

In the multi-core processor system 100 in the low power mode after the completion of migration to the low power mode, the music reproduction software 207 is distributed to and executed by the CPU #2; and the system call library 209 to the driver handler 212 are executed in parallel by the CPUs #0 and #1 in the ultra-low clock state.

As described, in the multi-core processor system 100 in the low power mode, the clock of the CPUs #0 and #1 is reduced leaving the processing capacity thereof capable of executing the parallel software maintained as it is and thereby, the distributed processing can be executed and the power consumption can be reduced.

Even when the clock frequencies of the CPUs #0 and #1 are set such that the processing capacity of the CPUs #0 and #1 and the processing capacity of the CPUs #2 and #3 are equal to each other, the power consumption of the CPUs #0 and #1 is consequently higher than that of the other CPUs. This is because the CPUs #0 and #1 each have more elements such as the cache memories. A difference in the power consumption among the CPUs will be described later with reference to FIG. 11.

Figure 6:
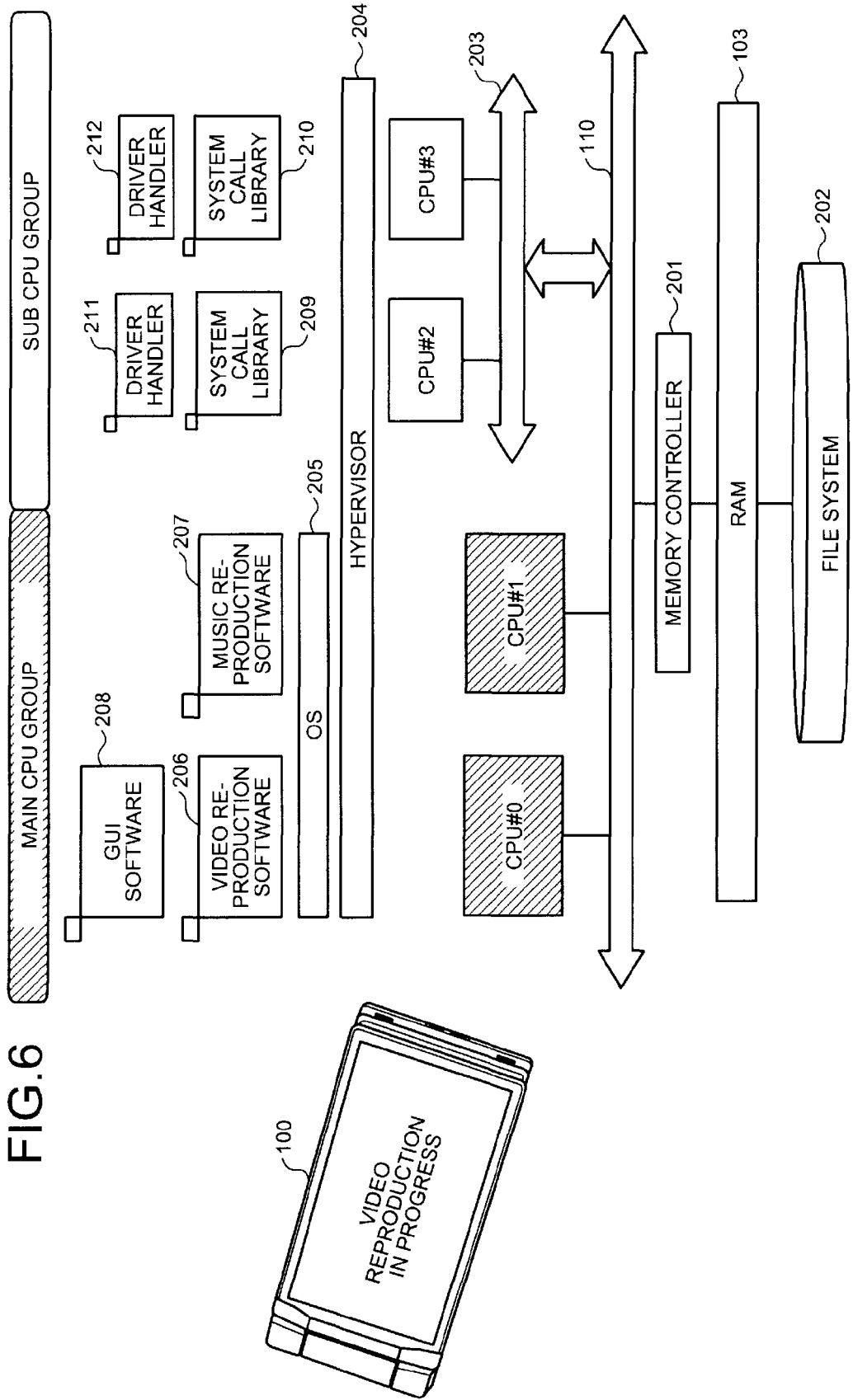
FIG. 6 is a diagram for explaining the state of the multi-core processor system 100 in the normal mode.

FIG. 6 is a diagram for explaining the state of the multi-core processor system 100 in the normal mode. The CPUs #0 and #1 form the main CPU group in the multi-core processor system 100 in the normal mode. The display 107 currently reproduces a video image using the video reproduction software 206. The video reproduction software 206, the music reproduction software 207, and the GUI software 208 currently reproducing the video image are executed by the CPUs #0 and #1. The system call libraries 209 and 210 and the driver handlers 211 and 212 are executed by the CPUs #2 and #3 that form the sub CPU group.

Figure 7:
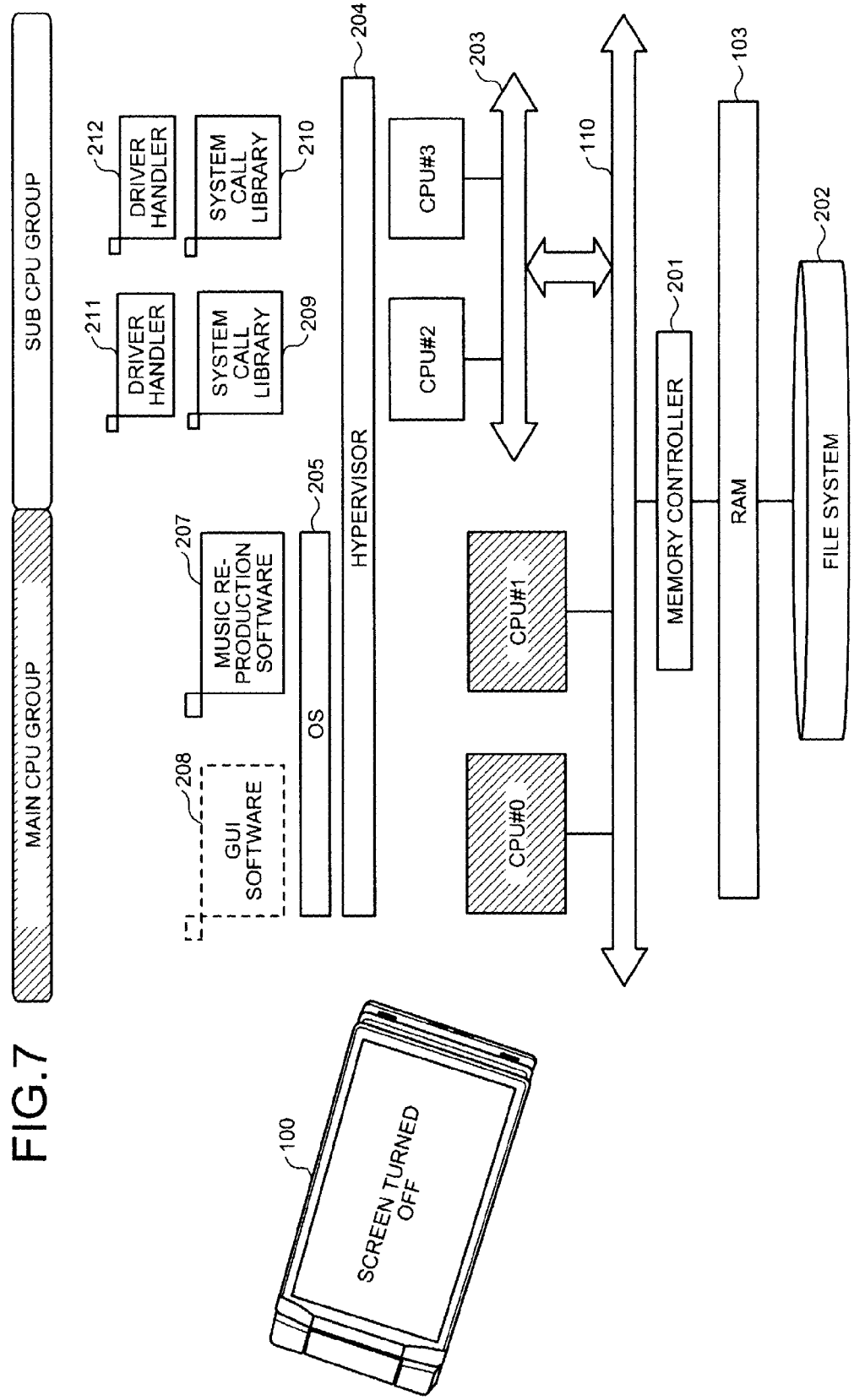
FIG. 7 is a diagram for explaining detection of transition of the multi-core processor system 100 from the normal mode to the low power mode.

FIG. 7 is a diagram for explaining the detection of the transition of the multi-core processor system 100 from the normal mode to the low power mode. The multi-core processor system 100 in FIG. 7 is in a state where a specific time period elapses after the operation of the video reproduction software 206 executed in FIG. 6 comes to an end and a stand-by screen displayed on the display 107 disappears. The disappearance of the stand-by screen sets the GUI software 208 to be in a stand-by state. When this state is established, the multi-core processor system 100 detects that the OS can be migrated to the CPUs whose maximal processing capacity values are low.

Figure 8:
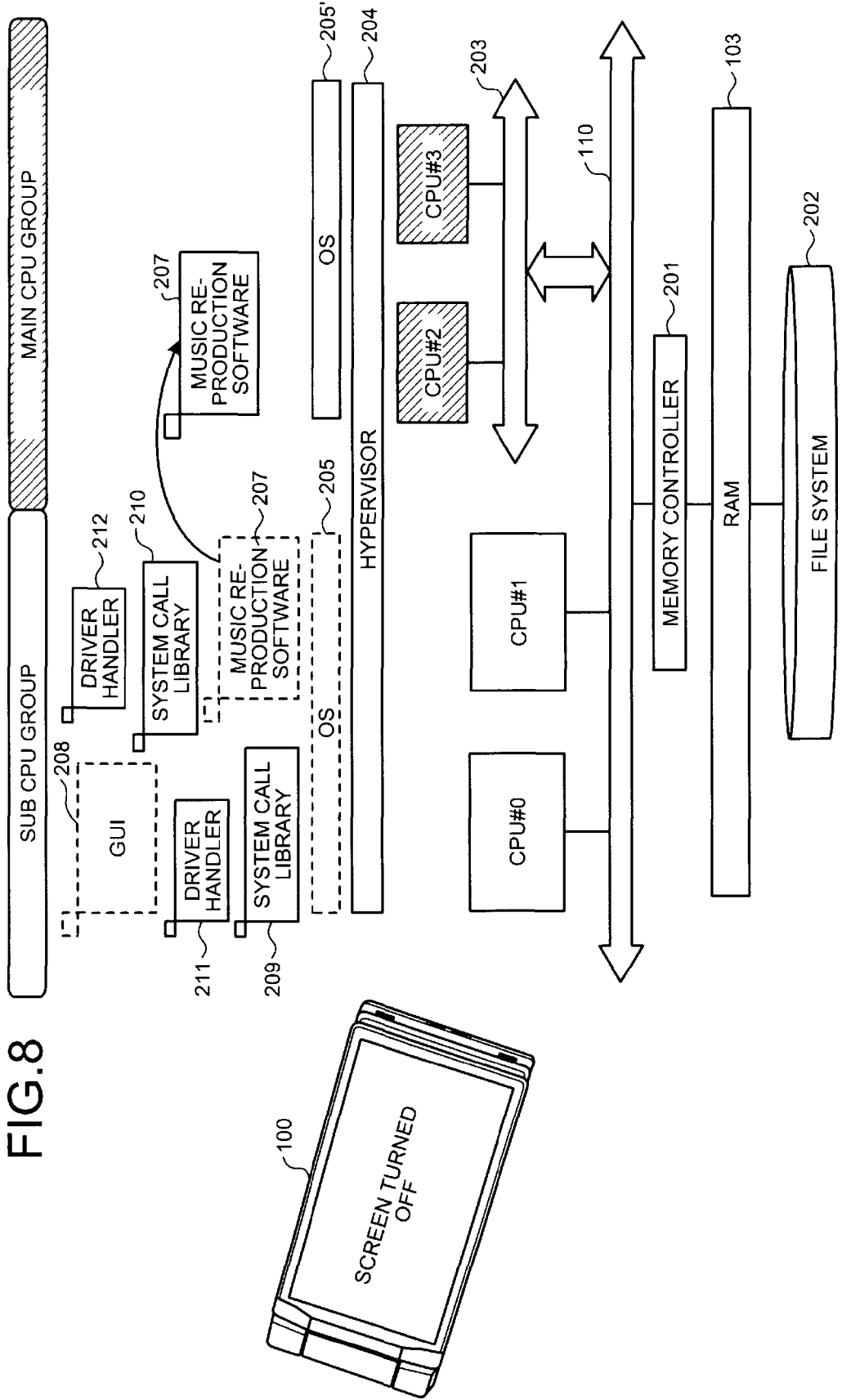
FIG. 8 is a diagram for explaining a state where the mode of the multi-core processor system 100 transitions from the normal mode to the low power mode.

FIG. 8 is a diagram for explaining a state where the mode of the multi-core processor system 100 transitions from the normal mode to the low power mode. The multi-core processor system 100 in FIG. 8 is in a state where the multi-core processor system 100 detects that the OS can be migrated to the CPUs whose maximal processing capacity values are low in FIG. 7. After the detection, either of the CPUs #0 and #1 migrates the system call library 209 to the driver handler 212 to the CPUs #0 and #1, using the OS 205. After the migration, either of the CPUs #0 and #1 starts up the OS 205' using the hypervisor 204.

After completion of the starting up of the OS 205', either of the CPUs #2 and #3 migrates the software executed by the CPUs #0 and #1 to the CPUs #2 and #3. In FIG. 8, either of the CPUs #2 and #3 migrates the music reproduction software 207 and the system call library 209 to the driver handler 212. After completion of the starting up of the OS 205', either of the CPUs #2 and #3 causes the operation of the OS 205 to come to an end. After the operation of the OS 205 comes to an end, either of the CPUs #2 and #3 sets the CPUs #0 and #1 to be in the ultra-low clock state.

After setting the ultra-low clock state, if the system call library 209 to the driver handler 212 are called, the CPUs #0 and #1 execute the system call library 209 to the driver handler 212 in parallel. The details of the transition process from the normal mode to the low power mode will be described later with reference to FIG. 13.

Figure 9:
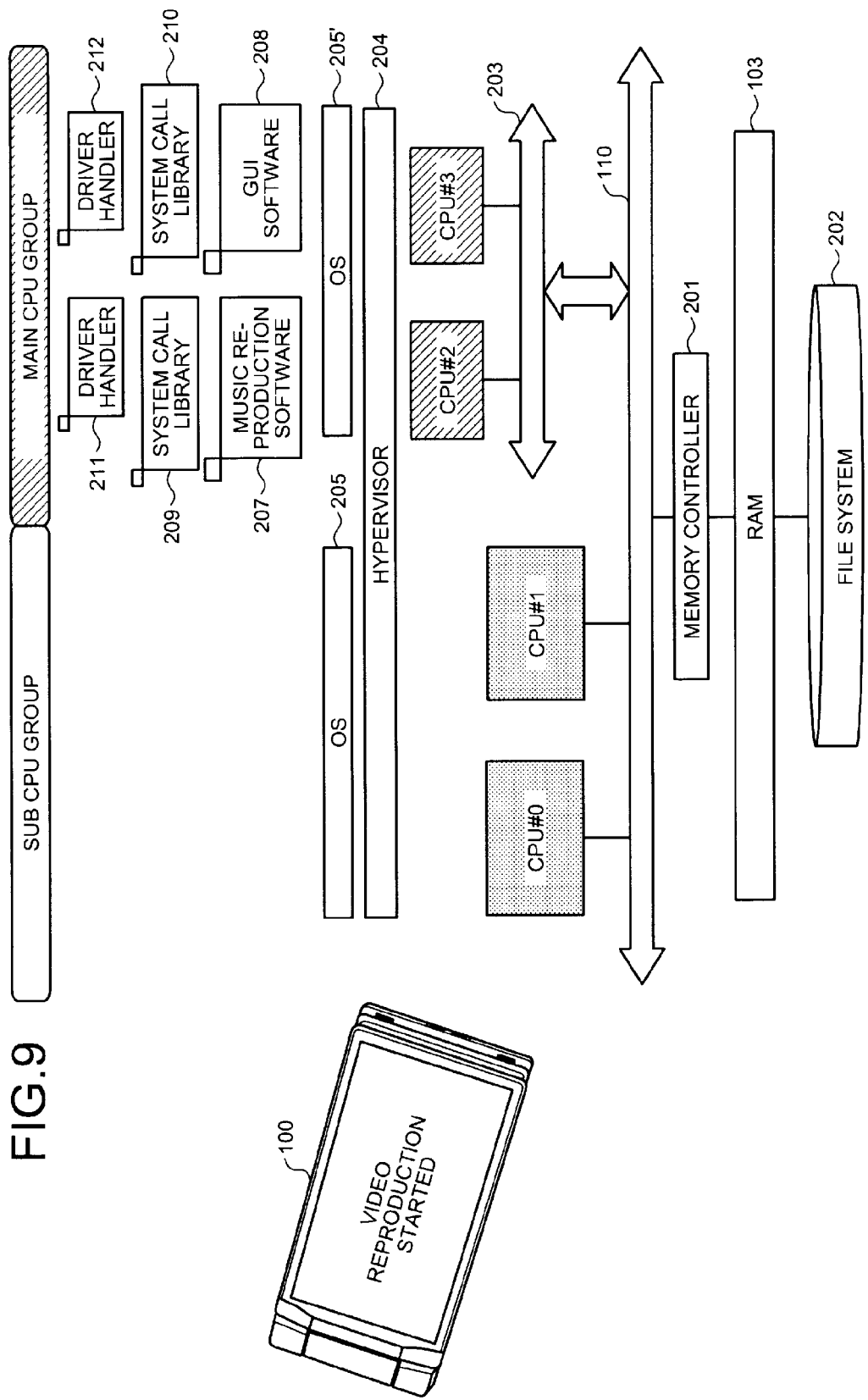
FIG. 9 is a diagram for explaining a state where the mode of the multi-core processor system 100 transitions from the low power mode to the normal mode.

FIG. 9 is a diagram for explaining a state where the mode of the multi-core processor system 100 transitions from the low power mode to the normal mode. After the low power mode is established in FIG. 8, the multi-core processor system 100 is in a state where high-load software are started up. The "high-load software" are the video reproduction software 206, etc. The starting-up of the high-load software causes the multi-core processor system 100 to start to transition from the low power mode to the normal mode. In this case, the CPUs #2 and #3 set the clocks to be at the maximum and execute the GUI software 208 during the transition. The CPUs #2 and #3 start up the OS 205 using the hypervisor 204.

Figure 10:
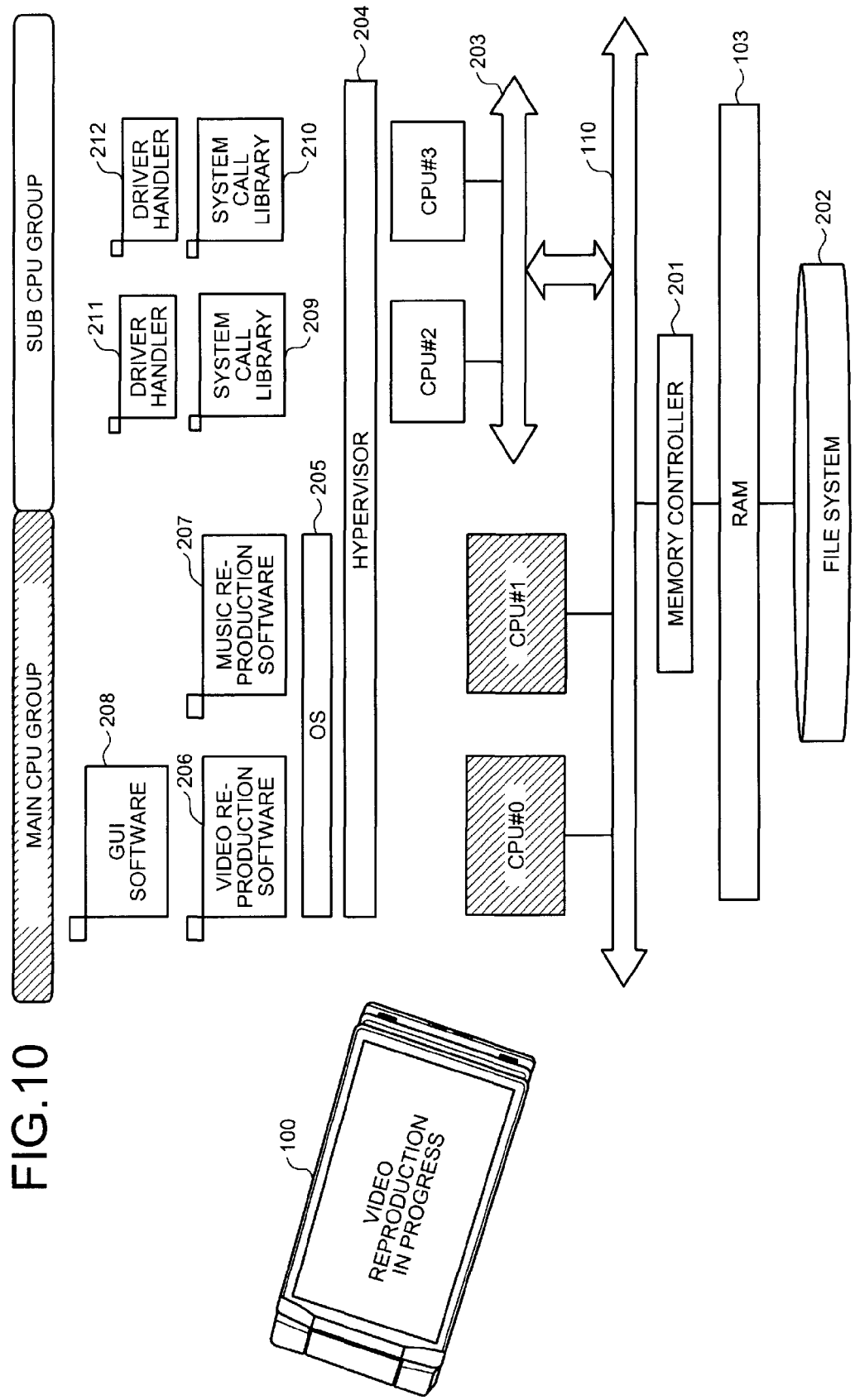
FIG. 10 is a diagram for explaining a state after the mode of the multi-core processor system 100 is restored from the low power mode to the normal mode.

FIG. 10 is a diagram for explaining a state after the mode of the multi-core processor system 100 is restored from the low power mode to the normal mode. The multi-core processor system 100 in FIG. 9 is in a state where the multi-core processor system 100 starts to transition from the low power mode to the normal mode and completes the starting-up of the OS 205 in FIG. 9. When the starting-up of the OS 205 is completed, the video reproduction software 206 to the GUI software 208 are distributed to and executed by the CPUs #0 and #1 and the system call library 209 to the driver handler 212 are executed in parallel by the CPUs #2 and #3. The CPUs #0 and #1 causes the operation of the OS 205' to come to an end. The details of the transition process from the low power mode to the normal mode will be described later with reference to FIG. 14.

FIG. 11 is a diagram for explaining an example of the power consumption of the multi-core processor system 100 in the normal mode and the low power mode, respectively. A table 1101 shows an example of the clock frequencies required when the group of CPUs whose maximal processing capacity values are high and the group of CPUs whose maximal processing capacity values are low execute software, and the power consumption corresponding to the clock frequencies. A table 1102 is a table that shows an example of power consumption of the multi-core processor system 100 in each of the normal mode and the low power mode calculated based on the table 1101.

The state of the multi-core processor system 100 in the normal mode is the state described with reference to FIG. 7. For example, the CPUs #0 and #1 to be the main CPU group execute the OS 205; the CPU #1 executes the music reproduction software 207; and the CPUs #0 and #1 operate at the clock frequency of 200 [MHz]. The CPUs #2 and #3 to be the sub CPU group execute the system call library 209 to the driver handler 212 that are the parallel software, and operate at the clock frequency of 20 [MHz].

Similarly, the state of the multi-core processor system 100 in the low power mode is the state described with reference to FIG. 8. For example, the CPUs #2 and #3 to be the main CPU group execute the OS 205'; the CPU #2 executes the music reproduction software 207; and the CPUs #2 and #3 operate at the clock frequency of 200 [MHz]. The CPUs #0 and #1 to be the sub CPU group execute the system call library 209 to the driver handler 212 that are the parallel software, and operate at the clock frequency of 20 [MHz]. In the table 1101, the group of CPUs whose maximal processing capacity values are high consume more power than the other group of CPUs even when the same clock frequency is employed for the groups because each CPU of this group of CPUs has more cache memories and elements for the amount by which the processing capacity value thereof is higher, therefore, the amount of leak current increases and power consumption is increased.

From the table 1101, in the multi-core processor system 100 in the normal mode, the power consumption of the group of CPUs whose maximal processing capacity values are high is 240 [mW] and that of the group of CPUs whose maximal processing capacity values are low is 20 [mW]. Therefore, the total is 260 [mW] as shown in the table 1102. From the table 1101, in the multi-core processor system 100 in the low power mode, the power consumption of the group of CPUs whose maximal processing capacity values are high is 24 [mW] and that of the group of CPUs whose maximal processing capacity values are low is 200 [mW]. Therefore, the total is 224 [mW] as shown in the table 1102. As above, the low power mode can reduce the power consumption relative to the normal mode.

The power consumption can also be reduced even when any software other than the OS is migrated. For example, it is assumed: that the maximal clock frequency of 400 [MHz] is present for the group of CPUs whose maximal processing capacity values are intermediate; that the group of CPUs whose maximal processing capacity values are intermediate consumes power of 110 [mW] at the clock frequency of 100 [MHz] and consumes power of 22 [mW] at the clock frequency of 20 [MHz]; and that the OS and the high-load software are executed by the group of CPUs whose maximal processing capacity values are high, the music reproduction software 207 is executed by the group of CPUs whose maximal processing capacity values are intermediate, and the parallel software is executed by the group of CPUs whose maximal processing capacity values are low.

In this case, the total power consumption is 110+20=130 [mW] of the group of CPUs whose maximal processing capacity values are intermediate and the group of CPUs whose maximal processing capacity values are low. A case is assumed next where the migration process is executed for the music reproduction software 207 and the parallel software. In this case, the group of CPUs whose maximal processing capacity values are high maintains the state, the parallel software is executed by the group of CPUs whose maximal processing capacity values are intermediate, and the music reproduction software 207 is executed by the group of CPUs whose maximal processing capacity values are low. The total power consumption in this case is 22+100=122 [mW]. Therefore, the power consumption can be reduced further than that before the migration process is executed.

FIG. 12 is a diagram for explaining an example of the contents of the use case table 301. This table has two fields including "event type" and "event contents". The event type field stores values for distinguish an event to be a trigger for the transition to the low power mode and an event to be a trigger for the transition to the normal mode, that is an occurring event. When the event type field has therein "transition to the low power mode", the occurring event is the trigger for the transition to the low power mode and, when the event type field has therein "transition to the normal mode", the occurring event is the trigger for the transition to the normal mode. The event contents field stores therein the contents of an event.

For example, when an event occurs that instructs the user to transition the mode to the low power mode, the multi-core processor system 100 determines that the event enables migration to the cores whose maximal processing capacity values are low and, when the mode is the normal mode, transitions the mode to the low power mode. Similarly, even in a case where an event occurs that the high-load software is not executed for a specific time period and the remaining power of the battery is less than or equal to a given value, when the mode is the normal mode, the multi-core processor system 100 transitions the mode to the low power mode.

When an event is a start-up request for the GUI software 208 as the high-load software, the multi-core processor system 100 determines that the event requests migration to the cores whose maximal processing capacity values are high and, when the mode is the low power mode, transitions the mode to the normal mode. Similarly, when an event is a start-up request for the video reproduction software 206, game software, etc., as the high-load software, the multi-core processor system 100 transitions the mode to the normal mode when the mode is the low power mode.

A method of registering software to be migrated for the "transition to the normal mode" when a start-up request occurs can be a method of determining whether the computing capacity required by the software to be migrated exceeds a computing capacity that exceeds a threshold value, using an electronic system level (ESL) simulator when the system is designed.

In a case where start-up preparation of the high-load software occurs as an event triggering "transition to the normal mode", the multi-core processor system 100 may transition the mode to the normal mode when the mode is the low power mode. The "start-up preparation of the high-load software" is pre-processing executed when the high-load software are set to be started up at a predetermined time.

For example, it is assumed that, when the user of the multi-core processor system 100 sets software that notifies of an alarm, etc., at a predetermined time, the software notifying the alarm is high-load software. The multi-core processor system 100 transitions the mode to the normal mode before the predetermined time when the mode is the low power mode and thereby, can start up the high-load software at the predetermined time in the normal mode. For example, the multi-core processor system 100 may execute a transition process from the low power mode to the normal mode at a time acquired by subtracting from the predetermined time, the time period necessary for completing the starting up of the OS 205.

Figure 13:
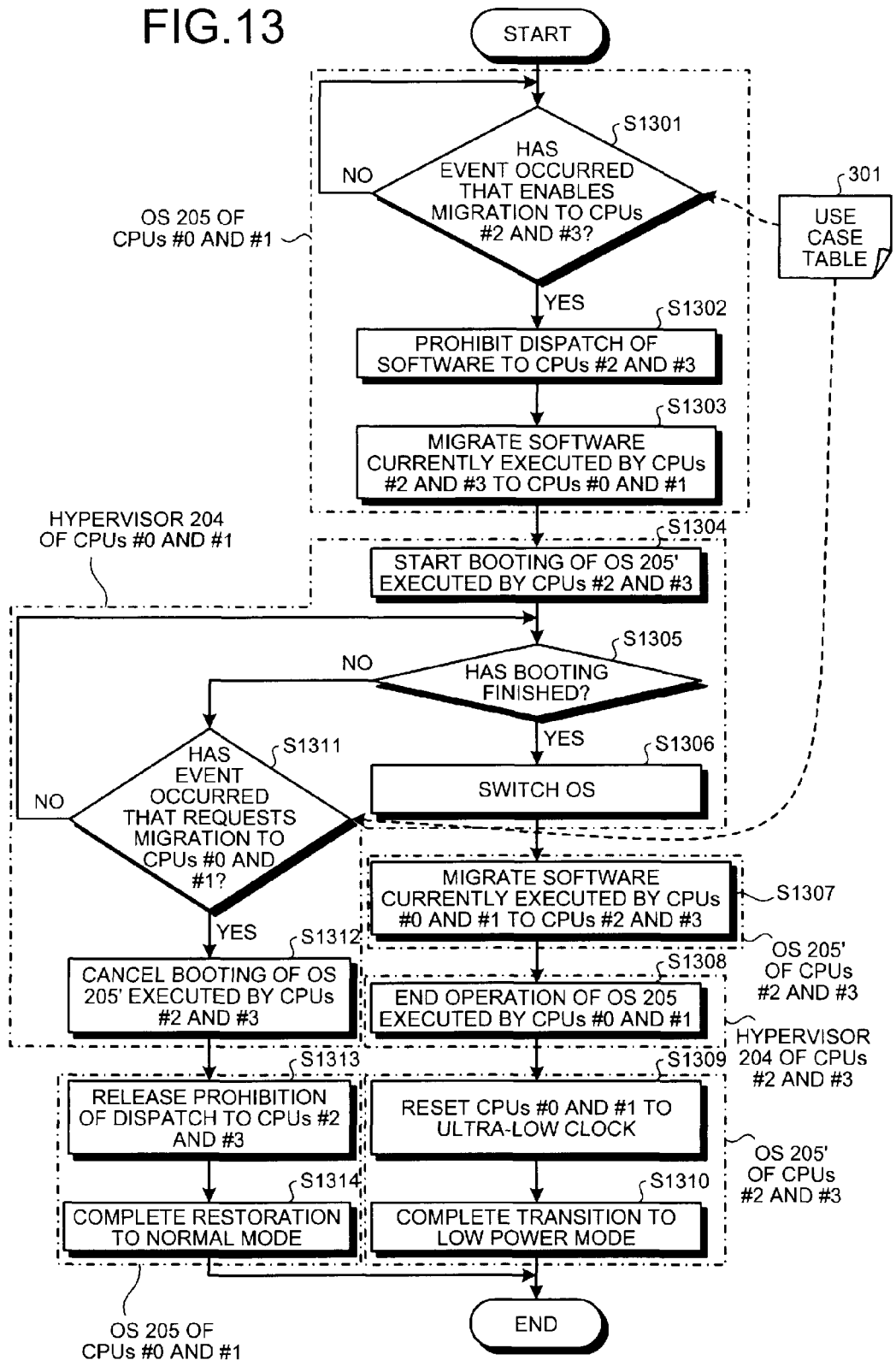
FIG. 13 is a flowchart of a transition process from the normal mode to the low power mode.

FIG. 13 is a flowchart of the transition process from the normal mode to the low power mode. As to the transition process from the normal mode to the low power mode and the transition process from the low power mode to the normal mode, at least one among the CPUs #0 and #1 has to execute the processes when the group of CPUs whose maximal processing capacity values are high executes the processes. Only one among the CPUs #2 and #3 has to execute the processes when the group of CPUs whose maximal processing capacity values are low executes the processes. In the description with reference to FIGS. 13 and 14, for simplicity of the description, the description will be made assuming that the CPU #0 executes the processes when the group of CPUs whose maximal processing capacity values are high executes the processes and assuming that the CPU #2 executes the processes when the group of CPUs whose maximal processing capacity values are low executes the processes.

Using the OS 205, the CPU #0 determines whether an event has occurred that enables the migration to the CPUs #2 and #3 (step S1301). The event enabling the migration is an event in the use case table 301, for which the value in the event type field is a value indicating the low power mode. If the CPU #0 determines that an event enabling the migration has not occurred (step S1301: NO), the CPU #0 executes the process at step S1301 after a specific time period. If the CPU #0 determines that an event enabling the migration has occurred (step S1301: YES), the CPU #0 prohibits any dispatch of any software to the CPUs #2 and #3 (step S1302).

After prohibiting dispatch, the CPU #0 migrates the software currently executed by the CPUs #2 and #3 to the CPUs #0 and #1, using the OS 205 (step S1303). The software to be migrated are all software excluding the OS 205. All software excluding the OS 205 are migrated because the execution of the software can not be continued consequent to an initialization of the memories when the OS 205' is booted at the next process step.

After migrating all the software currently executed, the CPU #0 starts the booting of the OS 205' executed by the CPUs #2 and #3 using the hypervisor 204 (step S1304). After starting the booting, the CPU #0 determines whether the booting of the OS 205' has finished (step S1305). When the CPU #0 determines that the booting has finished (step S1305:

YES), the CPU #0 switches the OS that manages the multi-core processor system 100 from the OS 205 to the OS 205' (step S1306).

After switching the OS, the CPU #2 migrates all the software currently executed by the CPUs #0 and #1 to the CPUs #2 and #3 using the OS 205' (step S1307). After migrating all the software, the CPU #2 causes the operation of the OS 205 executed by the CPUs #0 and #1 to come to an end using the hypervisor 204 (step S1308). After the operation of the OS 205 comes to an end, the CPU #2 resets the CPUs #0 and #1 to the ultra-low clock using the OS 205' (step S1309). Thereby, the multi-core processor system 100 sets the processing capacity values of the CPUs #0 and #1 to be the migration origin cores, at the ultra-low clock. When the resetting comes to an end, the CPU #2 completes the transition to the low power mode (step S1310) and causes the process to come to an end.

If the CPU #0 determines that the booting of the OS 205' has not finished (step S1305; NO), the CPU #0 determines whether an event has occurred that requests migration to the CPUs #0 and #1 (step S1311). If the CPU #0 determines that no event has occurred that requests the migration (step S1311: NO), the CPU #0 progresses to the process at step S1305.

If the CPU #0 determines that an event has occurred that requests the migration (step S1311: YES), the CPU #0 cancels the booting of the OS 205' executed by the CPUs #2 and #3 (step S1312). The event requesting the migration is an event in the use case table 301, for which the value in the event type field indicates the transition to the normal mode, After cancelling the booting, the CPU #0 releases the prohibition of the dispatch to the CPUs #2 and #3 using the OS 205 (step S1313). After releasing the prohibition of the dispatch, the CPU #0 completes the restoration to the normal mode (step S1314) and causes the process to come to an end.

If software other than the OS is migrated as the specific software ("step S1301: YES"), the CPU #0 determines that the migration is executable and thereafter, causes the specific software to migrate to the CPUs #2 and #3. After the migration, the CPU #2 may progress to the process at step S1309.

FIG. 14 is a flowchart of the transition process from the low power mode to the normal mode. The CPU #2, using the OS 205', determines whether an event has occurred that requests migration to the CPUs #0 and #1 (step S1401). If the CPU #2 determines that no event has occurred that requests the migration (step S1401: NO), the CPU #2 progresses to the process at S1401 after standing by for a specific time period.

If the CPU #2 determines that an event has occurred that requests the migration (step S1401: YES), the CPU #2 changes the clock of the CPUs #2 and #3 to the maximum (step S1402). After changing the clock to the maximum, the CPU #2 prohibits dispatch to the CPUs #0 and #1 (step S1403), and migrates all software currently executed by the CPUs #0 and #1, to the CPUs #2 and #3 (step S1404).

After migrating all the software, the CPU #2 starts booting of the OS 205 executed by the CPUs #0 and #1 using the hypervisor 204 (step S1405). After starting the booting of the OS 205, the CPU #2 determines whether the booting of the OS 205 has finished (step S1406). If the CPU #2 determines that the booting has not finished (step S1406: NO), the CPU #2 again executes the process at step S1406 after a specific time period. If the CPU #2 determines that the booting has finished (step S1406: YES), the CPU #2 switches the OS managing the multi-core processor system 100 from the OS 205' to the OS 205 (step S1407).

After switching the OS, the CPU #0 migrates the software currently executed by the CPUs #2 and #3 to the CPUs #0 and #1, using the OS 205 (step S1408). After the migration, the CPU #0 causes the operation of the OS 205' executed by the CPUs #2 and #3 to come to an end, using the hypervisor 204 (step S1409). After the operation of the OS 205' comes to an end, the CPU #0 resets the CPUs #2 and #3 to the low clock, using the OS 205 (step S1410). After the resetting comes to an end, the CPU #0 completes the transition to the normal mode (step S1411) and causes the process to come to an end.

If software other than the OS is migrated as the specific software (step S1401: YES), the CPU #2 determines that migration is requested and thereafter, causes the specific software to migrate to the CPUs #0 and #1. After the migration, the CPU #0 may progress to the process at step S1410.

As described, according to the multi-core processor system, the power control method, and the power control program, the state of migration of the specific software to the migration destination cores whose maximal processing capacity values are lower than those of the migration origin cores is detected. When the state of migration is detected, the multi-core processor system sets the processing capacity of each of migration origin cores to be low before and after the migration. Thereby, any leak current that is generated at the migration origin cores whose maximal processing capacity values are high can be reduced, and the power consumption can be reduced maintaining high core utilization efficiency without increasing the production cost or the area for implementing the system.

When the specific software is software that includes a migration function, the multi-core processor system may migrate the specific software from the migration origin cores that currently execute the specific software to the migration destination cores. Thereby, the OS including the migration function is migrated to the migration destination cores whose maximal processing capacity values are low. Therefore, any leak current that is generated at the migration origin cores whose maximal processing capacity values are high can be reduced, and the power consumption can be reduced. In particular, the processing capacity required by the OS is significantly high compared to the processing capacity required by the software that is executable in parallel and therefore, any leak current can significantly be reduced when the OS is migrated to the migration destination cores whose maximal processing capacity values are low.

The multi-core processor system determines that the occurring event is an event that enables the specific software to be migrated to the cores whose maximal processing capacity values are low. The multi-core processor system detects the state of migration of the specific software to the migration destination cores whose maximal processing capacity values are lower than those of the migration origin cores. When the state of migration is detected, the multi-core processor system may set the processing capacity of each of the migration origin cores to be low before and after the migration.

Thereby, the multi-core processor system can reduce any leak current that is generated at the migration origin cores whose maximal processing capacity values are high and therefore, can reduce the power consumption. The determination of the occurring event is determined according to whether the event is registered in the database. Therefore, only changing the contents of the database can easily change the form of the operation and the multi-core processor system can easily be operated.

When an event occurs that requests the migration to the cores whose maximal processing capacity values are higher than those of the migration origin cores during the migration of the specific software, the multi-core processor system may cancel the migration of the specific software and does not consequently have to migrate the specific software. For example, the time period necessary for the migration of the OS includes the time period to boot the OS and the time period to accept the operation by the user is sufficient and therefore, an event requesting, for example, starting-up of the high-load software may occur during this time period. In such a case, the multi-core processor system according to the embodiment immediately returns to the normal mode without once transitioning to the low power mode and again migrating to the normal mode. Therefore, the occurring event can be coped with immediately.

The multi-core processor system determines that the occurring event is an event requesting migration to the cores whose maximal processing capacity values are higher than those of the migration origin cores, and detects the state of migration of the specific software to the cores whose maximal processing capacity values are higher than those of the migration origin cores. When the multi-core processor system detects the state of migration, the multi-core processor system may set the processing capacity of the migration origin cores to be low before and after the migration. Thereby, the multi-core processor system migrates the specific software operated by the cores whose maximal processing capacity values are low to the cores whose maximal processing capacity values are high and thereby, can immediately respond to an interrupt.

For example, in a case where the cores whose maximal processing capacity values are high receive the notification of the interruption request and the specific software receives the notification produced from the interruption request, the specific software can most quickly respond to the interruption request when the specific software is executed by the cores whose maximal processing capacity values are high. For example, in a case where the interruption request from the keyboard is received, when the specific software is executed by the cores whose maximal processing capacity values are high, the specific software can most quickly respond to the signal from the keyboard. As described, even when the power consumption of the multi-core processor system is reduced and the performance of the specific software to respond to an interrupt is degraded, the speed to respond to the interrupt can be restored by migrating the specific software.

The multi-core processor system of the embodiment is controlled by the OS and does not need any multiple power source voltages that are indispensable for the DVFS control. Therefore, the multi-core processor system can be applied easily to the conventional multi-core processor system. According to the multi-core processor system of the embodiment, even when multiple threads are executed by the multiple cores, the system is operated according to the use case table. Therefore, the estimation is not difficult like that of the DVFS control and the operation is easy. According to the multi-core processor system of the embodiment, the CPUs respectively having a large cache memory are operated at a low clock and therefore, the leak current can be reduced and whereby, reductions in power consumption can be achieved.

The power control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The multi-core processor system, the power control method, and the power control program achieve reduced power consumption without increasing production costs or the area for implementing the system.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising:
    a first core group comprising a plurality of first cores processing an event;
    a second core group comprising a plurality of second cores, a number of the plurality of second cores included in the second core group being the same as a number of the plurality of first cores included in the first core group, the plurality of second cores having a lower maximum processing capacity value for processing the event than the plurality of first cores;
    a storage storing migration event information showing an event that enables migration from the first core group to the second core group; and
    one or more processors configured to:
        detect an allocation of a migration event corresponding to the migration event information in the first core group;
        start a second operating system associated with the second core group and cause a first operating system associated with the first core group to end;
        migrate the migration event assigned to a first core included the first core group to an arbitrary second core included in the second core group; and
        set a processing capacity value of the first core group after the migration event has migrated to be a processing capability value lower than a processing capability value before the migration event has migrated.

2. The multi-core processor system according to claim 1, wherein the one or more processors are further configured to:
    write an information showing processing state of the first core group stored in a first storage corresponding to the first core group into a second storage corresponding to the second core group when the migration event is detected.

3. The multi-core processor system according to claim 1, wherein the one or more processors are further configured to:
    migrate a first software from a first core of the first core group currently executing the first software to a second core of the second core group when the first software includes second software to migrate the second software from the first core to the second core, and
    detect a state of migration of the first software from the first core to the second core.

4. The multi-core processor system according to claim 1, wherein the one or more processors are further configured to:
    determine based on a database storing an event that enables a first software to be migrated to a second core of the second core group whose specific processing capacity value is lower than that of a first core of the first core group, whether an occurring event is the event enabling the migration, and
    set the processing capacity value of the first core at a time of the detection to be a processing capacity value lower than that before the migration upon determining that the event enabling the migration has occurred and detecting the state of the migration.

5. The multi-core processor system according to claim 4, wherein the determines one or more processors determine whether an occurring event stored on a database is an event that requests migration of the first software to the core whose specific processing capacity value is higher than that of the second core, and the core one or more processors, upon determining that an event requesting migration of the first software to the first core has occurred during the migration of the first software, do not migrate the first software.

6. The multi-core processor system according to claim 1, wherein the one or more processors determine whether an occurring event is an event stored on a database that requests migration of a first software to a first core of the first core group whose specific processing capacity value is higher than that of a second core of the second core group, the one or more processors detect the state of the migration of the first software to the first core whose specific processing capacity value is higher than that of the second core, and the one or more processors, upon determining that the event requesting the migration has occurred and detecting the state of the migration, set the processing capacity value of the second core at a time of the detection to be a processing capacity value lower than that before the migration.

7. A control method for a multi-core processor system comprising:

a first core group comprising a plurality of first cores processing an event;

a second core group comprising a plurality of second cores, a number of the plurality of second cores included in the second core group being the same as a number of the plurality of first cores included in the first core group, the plurality of second cores having a lower maximum processing capacity value for processing the event than the plurality of first cores; and a storage storing a migration event information showing an event that enables migration from the first core group to the second core group, wherein the control method comprises:

detecting, by one or more processors, an allocation of a migration event correspond to the migration event information in the first core group;

starting a second operating system associated with the second core group and cause a first operating system associated with the first core group to end;

migrating, by the one or more processors, the migration event assigned to a first core included in the first core group to corresponding an arbitrary second core included in the second core group; and setting, by the arbitrary core, processing capability value of the first core group after the migration event has migrated to be a processing capability value lower than a processing capability value before the migration event has migrated.

8. The control method according to claim 7, further comprising:

writing, by the one or more processors, an information showing processing state of the first core group stored in a first storage corresponding to the first core group into a second storage corresponding to the second core group when the migration event is detected.

9. The control method according to claim 7, further comprising:

migrating, by the one or more processors, a first software from a first core of the first core group currently executing the first software to a second core of the second core group when the first software includes second software to migrate the second software from the first core to the second core, wherein the one or more processors detect a state of migration of the first software from the first core to the second core.

10. The control method according to claim 7, further comprising:

determining, by the one or more processors, based on a database storing an event that enables a first software to be migrated to a second core of the second core group whose specific processing capacity value is lower than that of a first core of the first core group, whether an occurring event is the event enabling the migration, and setting, by the one or more processors, the processing capacity value of the first core at a time of the detection to be a processing capacity value lower than that before the migration, upon determining that the event enabling the migration has occurred and detecting the state of the migration.

11. The control method according to claim 10, further comprising:

determining, by the one or more processors, whether an occurring event stored on a database is an event that requests migration of the first software to the core whose specific processing capacity value is higher than that of the second core, and not migrating, by the one or more processors, the first software, upon determining that an event requesting migration of the first software to the first core has occurred during the migration of the first software.

12. The control method according to claim 7, further comprising:

determining, by the one or more processors, whether an occurring event is an event stored on a database that requests migration of a first software to a first core of the first core group whose specific processing capacity value is higher than that of a second core of the second core group, detecting, by the one or more processors, the state of the migration of the first software to the first core whose specific processing capacity value is higher than that of the second core, and setting, by the one or more processors, the processing capacity value of the second core at a time of the detection to be a processing capacity value lower than that before the migration upon determining that the event requesting the migration has occurred and detecting the state of the migration.

\* \* \* \* \*